(12) United States Patent
Bae et al.

(10) Patent No.: US 11,902,502 B2
(45) Date of Patent: Feb. 13, 2024

(54) DISPLAY APPARATUS AND CONTROL METHOD THEREOF

(71) Applicant: SAMSUNG ELECTRONICS CO., LTD., Suwon-si (KR)

(72) Inventors: Jaehyeon Bae, Suwon-si (KR); Youngho Oh, Suwon-si (KR); Sungho Lee, Suwon-si (KR); Seungsoo Jeong, Suwon-si (KR); Woongil Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 319 days.

(21) Appl. No.: 17/246,039

(22) Filed: Apr. 30, 2021

(65) Prior Publication Data

US 2022/0239895 A1 Jul. 28, 2022

(30) Foreign Application Priority Data

Jan. 26, 2021 (KR) .................... 10-2021-0010985

(51) Int. Cl.
*G06T 3/40* (2006.01)
*G06T 7/00* (2017.01)
(Continued)

(52) U.S. Cl.
CPC ......... *H04N 13/395* (2018.05); *G06T 3/4007* (2013.01); *G06T 7/97* (2017.01);
(Continued)

(58) Field of Classification Search
None
See application file for complete search history.

(56) References Cited

U.S. PATENT DOCUMENTS

| 8,831,338 B2 | 9/2014 | Shibuhisa et al. |
| 9,128,367 B2 | 9/2015 | Yamashita et al. |

(Continued)

FOREIGN PATENT DOCUMENTS

| KR | 10-2015-0043546 A | 4/2015 |
| KR | 10-1844232 B1 | 4/2018 |

OTHER PUBLICATIONS

International Search Report dated Oct. 15, 2021 issued by the International Searching Authority in International Application No. PCT/KR2021/005461 (PCT/ISA/210).

(Continued)

*Primary Examiner* — Tyler W. Sullivan
(74) *Attorney, Agent, or Firm* — Sughrue Mion, PLLC

(57) ABSTRACT

A display apparatus and a control method thereof are provided. The display apparatus includes a communication interface configured to receive captured images and information related to the captured images; a display; and a processor configured to: obtain an object disparity of an object included in the captured images and a number of the captured images based on the information related to the captured images; identify whether a display disparity representable by the display matches the object disparity; based on the display disparity not matching the object disparity, generate interpolated images by performing image interpolation based on the display disparity, the object disparity, and the number of the captured images; and control the display to display a three-dimensional content based on the captured images and the interpolated images.

19 Claims, 12 Drawing Sheets

(51) Int. Cl.
*H04N 13/395* (2018.01)
*H04N 7/01* (2006.01)

(52) U.S. Cl.
CPC . *H04N 7/0135* (2013.01); *G06T 2207/20228* (2013.01); *G06V 2201/12* (2022.01)

(56) References Cited

U.S. PATENT DOCUMENTS

| | | |
|---|---|---|
| 9,188,849 B2 | 11/2015 | Yamashita et al. |
| 9,237,331 B2 | 1/2016 | Heinzle et al. |
| 10,009,592 B2 | 6/2018 | Lee et al. |
| 10,009,597 B2* | 6/2018 | Karafin ................ H04N 13/111 |
| 10,397,539 B2 | 8/2019 | Hwang et al. |
| 10,764,560 B2 | 9/2020 | Kuchnio et al. |
| 2011/0304618 A1 | 12/2011 | Chen et al. |
| 2012/0019634 A1* | 1/2012 | Jian ..................... H04N 13/111 |
| | | 348/54 |
| 2012/0133645 A1 | 5/2012 | Jung et al. |
| 2012/0140038 A1 | 6/2012 | Bi et al. |
| 2014/0132742 A1 | 5/2014 | Liu et al. |
| 2014/0205185 A1 | 7/2014 | Tokui et al. |
| 2016/0373714 A1 | 12/2016 | Lee et al. |
| 2017/0046819 A1* | 2/2017 | Sambongi ............... G06T 7/514 |
| 2017/0223332 A1* | 8/2017 | Guo ..................... H04N 13/128 |
| 2019/0045168 A1* | 2/2019 | Chaudhuri ........... H04N 13/139 |
| 2020/0082556 A1 | 3/2020 | Sano |

OTHER PUBLICATIONS

International Written Opinion dated Oct. 15, 2021 issued by the International Searching Authority in International Application No. PCT/KR2021/005461 (PCT/ISA/237).

* cited by examiner

| Object | Depth (mm) | Disparity |
|--------|------------|-----------|
| Circle | 3000 | 15 |

| Object | Disparity |
|---|---|
| Front (Circle) | 12 |
| Back (Square) | 4 |

FIG. 8A

| RESOLUTION | NUMBER OF IMAGES | DISPARITY | TOTAL DISPARITY |
|---|---|---|---|
| 2K, 4K | 51 | 2 | 102 |

FIG. 8B

| | RESOLUTION | NUMBER OF CAPTURED IMAGES | DISPARITY | TOTAL DISPARITY |
|---|---|---|---|---|
| RESIZING | 4K | 21 | 8 | 168 |
| | 2K | 21 | 4 | 84 |

FIG. 10

| Scene | Object | Depth (mm) | Disparity |
|---|---|---|---|
| 1 | 1 | 800 | 2 |
| 2 | 1 | 700 | 3 |
| 3 | 1 | 600 | 4 |
| 4 | 1 | 500 | 5 |
| 5 | 1 | 400 | 6 |
| 6 | 1 | 300 | 7 |
| 7 | 1 | 200 | 8 |

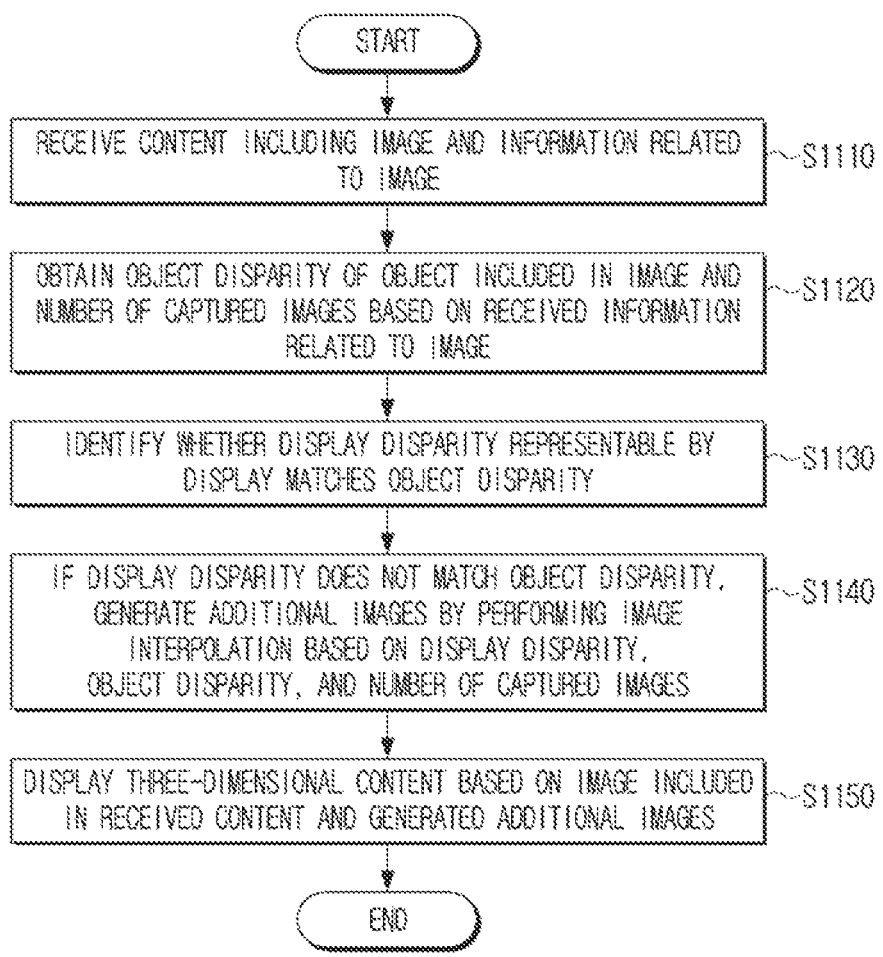

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2021-0010985, filed on Jan. 26, 2021, in the Korean Intellectual Property Office, the disclosure of which is incorporated by reference herein in its entirety.

BACKGROUND

1. Field

The disclosure relates to a display apparatus and a control method thereof, and more particularly to a display apparatus displaying a three-dimensional content by processing a captured image and a control method thereof.

2. Description of Related Art

Along with the development of electronic technologies, research has been actively conducted on technologies for providing a realistic visual representation of an object, including a volumetric display technology. The 3D technology of the related art refers to a technology regarding a planar image representing a depth through various effects of angles of view, but the volumetric display may refer to a technology of forming visual expression of an object in a physical three-dimensional space.

In order to represent a content with the volumetric display, an image of an object has to be captured with a sufficiently large number of cameras according to a specification required for a display apparatus. However, it is difficult to image an object with a large number of cameras capable of satisfying the required specification realistically. Accordingly, a method for imaging an object with a certain number of cameras and generating a necessary number of images using the captured images has been invented. However, since there are various specifications of the display apparatuses, it is difficult to produce a content for volumetric display satisfying the required specifications of all display apparatuses.

Therefore, there has been a demand for a technology of reproducing contents for the same volumetric display on various display apparatuses.

SUMMARY

Provided are a display apparatus processing a content for volumetric display so as to reproduce the content for volumetric display, and a control method thereof.

In accordance with an aspect of the disclosure, a display apparatus may include: a communication interface configured to receive captured images and information related to the captured images; a display; and a processor configured to: obtain an object disparity of an object included in the captured images and a number of the captured images based on the information related to the captured images; identify whether a display disparity representable by the display matches the object disparity; based on the display disparity not matching the object disparity, generate interpolated images by performing image interpolation based on the display disparity, the object disparity, and the number of the captured images; and control the display to display a three-dimensional content based on the captured images and the interpolated images.

The processor may be further configured to, based on the information related to the captured images including an object depth, obtain the object disparity based on the object depth.

The processor may be further configured to, based on the information related to the captured images including information regarding a focused object, obtain the object disparity based on the information regarding the focused object.

The processor may be further configured to, based on the information related to the captured images including camera information, obtain the object disparity based on the camera information, and the camera information may include a baseline, a focal length, and a pixel size.

The processor may be further configured to, based on the captured images including a plurality of objects including the object, move the plurality of objects to a zero plane, and obtain the object disparity based on the plurality of objects moved to the zero plane.

The processor may be further configured to identify whether the object disparity is displayable on the display based on the display disparity, and based on the object disparity being not displayable on the display, resize a resolution of the captured images based on the display disparity.

The processor may be further configured to, based on a sum of the number of the captured images and a number of the interpolated images exceeding a number of images displayable on the display, by an exceeded number of images, remove the exceeded number of images from the captured images and the interpolated images.

The processor may be further configured to, based on the object included in the captured images being a moving object and the information related to the captured images including information regarding the moving object and an object depth of the moving object, obtain the object disparity of the moving object based on the object depth, and generate the interpolated images based on the object disparity of the moving object and the display disparity.

The processor may be further configured to, based on the moving object moving closer to a camera position, reduce the number of the captured images and increase a rate of the image interpolation.

The processor may be further configured to, based on the moving object moving closer to a camera position, resize a resolution of the captured images to reduce the object disparity of the moving object.

In accordance with another aspect of the disclosure, a method for controlling a display apparatus may include: receiving captured images and information related to the captured images; obtaining an object disparity of an object included in the captured images and a number of the captured images based on the information related to the captured images; identifying whether a display disparity representable by the display matches the object disparity; based on the display disparity not matching the object disparity, generating interpolated images by performing image interpolation based on the display disparity, the object disparity, and the number of the captured images; and displaying a three-dimensional content based on the captured images and the interpolated images.

The obtaining may include, based on the information related to the captured images may include an object depth, obtaining the object disparity based on the object depth.

The obtaining may include, based on the information related to the captured images may include information regarding a focused object, obtaining the object disparity based on the information regarding the focused object.

The obtaining may include, based on the information related to the captured images including camera information, obtaining the object disparity based on the camera information, and wherein the camera information may include a baseline, a focal length, and a pixel size.

The obtaining may include, based on the captured images including a plurality of objects including the object, moving the plurality of objects to a zero plane, and obtaining the object disparity based on the plurality of objects moved to the zero plane.

The method may further include: identifying whether the object disparity is displayable on the display apparatus based on the display disparity; and based on the object disparity being not displayable on the display apparatus, resizing a resolution of the captured images based on the display disparity.

The method may further include: based on a sum of the number of the captured images and a number of the interpolated images exceeding a number of images displayable on the display apparatus by an exceeded number of images, removing the exceeded number of images from the captured images and the interpolated images.

The obtaining may include, based on the object included in the captured images being a moving object and the information related to the captured images including information regarding the moving object and an object depth of the moving object, obtaining the object disparity of the moving object based on the object depth. The generating may include generating the interpolated images based on the object disparity of the moving object and the display disparity.

The method may further include: based on the moving object moving closer to a camera position, reducing the number of the captured images and increasing a rate of the image interpolation.

The method may further include: based on the moving object moving closer to a camera position, resizing a resolution of the captured images to reduce the object disparity of the moving object.

In accordance with another aspect of the disclosure, an electronic device may include: at least one memory configured to store computer readable instructions and information of a display disparity that is representable by a display apparatus; and at least one processor configured to execute the computer readable instructions to: obtain a plurality of captured images in which an object is captured from a plurality of different viewpoints; obtain an object disparity of the object based on the plurality of captured images; based on identifying that the object disparity not matching the display disparity, generate interpolated images from the plurality of captured images, based on the display disparity, the object disparity, and information of a number of the captured images; and generate a three-dimensional image based on the captured images and the interpolated images.

BRIEF DESCRIPTION OF THE DRAWINGS

The above and other aspects, features, and advantages of certain embodiments of the present disclosure will be more apparent from the following detailed description taken in conjunction with the accompanying drawings, in which:

FIG. 8A is a diagram illustrating information of the display apparatus according to an embodiment;

FIG. 8B is a diagram illustrating information of a content including an image according to an embodiment;

FIG. 10 is a diagram illustrating a table including distance information according to movement of the object according to an embodiment; and FIG. 11 is a flowchart illustrating a method for controlling a display apparatus according to an embodiment.

DETAILED DESCRIPTION

Figure 1:
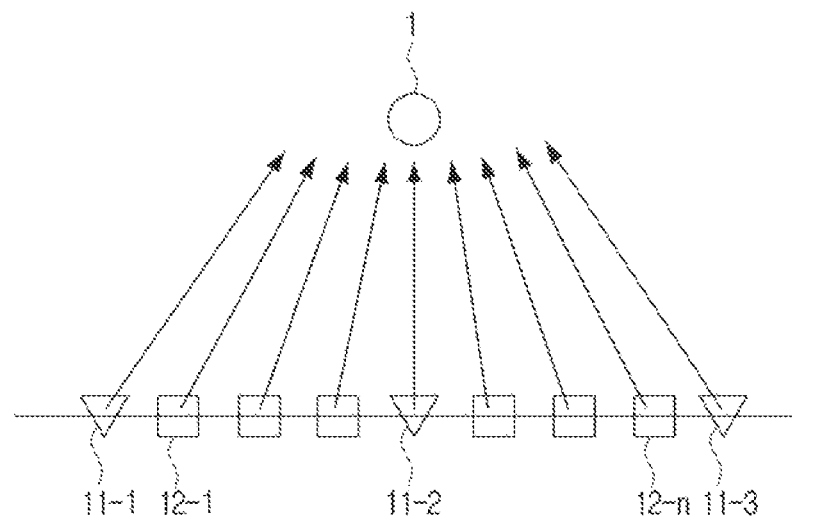
FIG. 1 is a diagram illustrating a process of displaying a three-dimensional content according to an embodiment.
Figure 1:
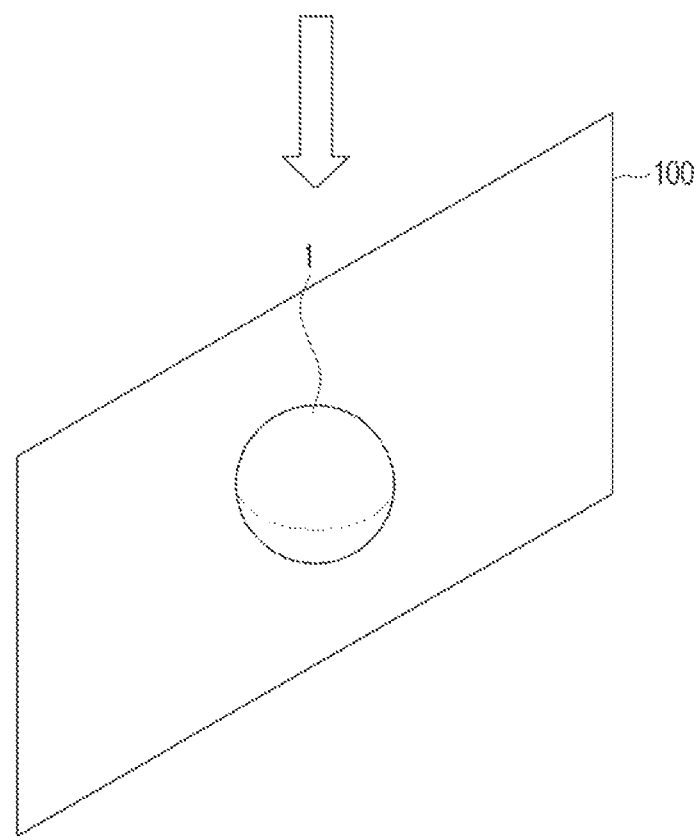

Hereinafter, various embodiments will be described in more detail with reference to the accompanying drawings. The embodiments disclosed in the specification may be variously changed. A specific embodiment may be illustrated in the drawing and described in detail in the detailed description. However, the specific embodiment disclosed in the accompanying drawing is merely for easy understanding of various embodiments. Accordingly, it should be understood that the technical spirit is not limited to the specific embodiment disclosed in the accompanying drawing, and all equivalents or alternatives included in the disclosed spirit and technical scope are included.

The terms including ordinals such as "first" or "second" may be used for describing various components, but the components are not limited by the above terms. The above terms may be only used for distinguishing one component from another.

It is to be understood that the terms such as "comprise," "include," or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof. If it is described that a certain element is "connected to" or "coupled to" another element, it should be understood that the certain element may be connected to the other element directly or through still another element. On the other hand, if it is described that a certain element is "directly coupled to" or "directly connected to" another element, it may be understood that there is no element therebetween.

A "module" or a "unit" regarding an element used in the disclosure may perform at least one function or operation. In addition, the "module" or the "unit" may perform the function or the operation by hardware, software, or a combination of hardware and software. In addition, a plurality of "modules" or a plurality of "units", except for a "module" or a "unit" which should be performed in specific hardware or performed in at least one processor, may be integrated into one module. Unless otherwise defined specifically, a singular expression may encompass a plural expression.

In describing the disclosure, it should be understood that the order of each step is not limited, unless a previous step should be performed before a subsequent step logically and in time. In other words, other than the above exceptions, the gist of the disclosure is not affected even if the process described as the subsequent step is performed before the process described as the previous step, and a scope of a right also should be defined regardless of the order of steps. In the specification, "A or B" does not only selectively indicate any one of A and B, but is defined to include both A and B. In addition, a term "including" in the disclosure may have meaning of further including other elements, in addition to the listed elements.

In the specification, compulsory elements necessary for the description of the disclosure are only described and elements with no relation with the gist of the disclosure may not be mentioned. It should not be interpreted as exclusive meaning of including only the mentioned elements, but should be interpreted as non-exclusive meaning of including other elements.

In addition, in describing the disclosure, a detailed description of the related art or configuration may be omitted when it is determined that the detailed description may unnecessarily obscure a gist of the disclosure. Meanwhile, each embodiment may be implemented or operated independently or the embodiment may also be implemented or operated in combination.

FIG. 1 is a diagram illustrating a process of displaying a three-dimensional content according to an embodiment.

An object 1 may be imaged using a plurality of cameras, to generate a three-dimensional content (or volumetric content) representing the object 1. In order to generate one scene of the three-dimensional content, an object may need to be imaged with a plurality of cameras at the same time. However, it is practically difficult since the object has to be imaged with a plurality of cameras, in order to generate the three-dimensional content. In addition, due to different resolutions and representable disparities of different display apparatuses, different display apparatuses may not able to display a three-dimensional content using the same captured images (or content). Accordingly, in the disclosure, a method for displaying a three-dimensional content by a plurality of different display apparatuses based on the same captured image and information related to the same captured image will be described.

Referring to FIG. 1, a certain number of cameras may image the object 1, and an external apparatus may generate a content using images 11-1, 11-2, and 11-3 obtained by imaging the object 1. A display apparatus 100 may receive a content including the captured images 11-1, 11-2, and 11-3 and information related to the captured images 11-1, 11-2, and 11-3. For example, the information related to the captured images 11-1, 11-2, and 11-3 may include the number of cameras that captured the images 11-1, 11-2, and 11-3 of the object 1 (or the number of the images 11-1, 11-2, and 11-3), a depth of the object 1, a disparity of the object 1, a baseline of the cameras, a focal length, a pixel size, information regarding a focused object, and the like.

The depth of the object refers to a deepness of an object. In other words, when a camera captures a planar image including an object, the depth of the object may refer to a distance between a virtual plane where the object is located and the camera. The disparity of the object may refer to an angle of view capable of recognizing a three-dimensional effect of the object. For example, when two cameras spaced apart from each other at a certain interval capture images, a center point of a first camera and a center point of a second camera are spaced apart from each other at a certain interval. The disparity of the object may refer to a distance between the center points of the two cameras spaced apart from each other. In other words, when the two cameras, which are spaced apart from each other at a certain interval, image one object, the disparity of the object may refer to a difference between positions of the object imaged from the first and the second cameras, or a difference in image location of the object seen or captured by the first camera and the second camera. In addition, the baseline of the cameras may refer to an interval or a distance between the cameras.

The display apparatus 100 may obtain the object disparity regarding the object 1 included in the image and the number of captured images based on the received information related to the image. For example, the display apparatus 100 may receive the object disparity directly from an external apparatus and calculate the object disparity based on the received the object depth. In addition, if the display apparatus 100 does not receive the object disparity or the object depth, the display apparatus 100 may estimate the object disparity by using the received information regarding the focused object. A display of the display apparatus 100 may include a plurality of layers and a display disparity representable by the display may be set on the display apparatus 100. The display disparity may refer to a maximum value of an object disparity that the display apparatus 100 is capable to represent on the display. The display apparatus 100 may determine whether the display disparity matches the object disparity. If the display disparity does not match the object disparity, the display apparatus 100 may generate additional images using the received image. For example, the display apparatus 100 may generate the additional images by performing image interpolation based on the display disparity, the object disparity, and the number of received images. The additional images may be also referred to as interpolated images. The generated additional images may be images 12-1 and 12-n having viewpoints that are positioned between viewpoints of the captured images 11-1, 11-2, and 11-3. The image interpolation will be described later in detail.

The display apparatus 100 may display the three-dimensional content based on the captured images 11-1, 11-2, and 11-3 and the generated additional images 12-1 and 12-n. The three-dimensional content displayed on the display apparatus 100 may include a plurality of images having various disparities. Accordingly, the display apparatus 100 may display the three-dimensional content representing the object 1, wherein the appearance of the three-dimensional content changes depending on the position or the angle from which a user sees the object 1.

Hereinafter, a configuration of the display apparatus will be described.

Figure 2:
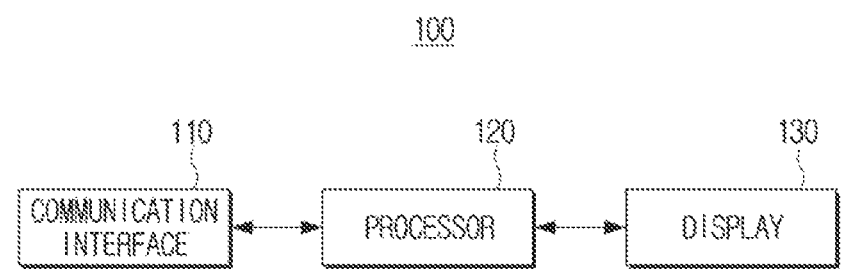
FIG. 2 is a block diagram illustrating a configuration of a display apparatus according to an embodiment.

FIG. 2 is a block diagram illustrating a configuration of a display apparatus according to an embodiment.

Referring to FIG. 2, the display apparatus 100 may include a communication interface 110, a processor 120, and a display 130. For example, the display apparatus 100 may include a smartphone, a tablet personal computer (PC), a navigation system, a slate PC, a wearable device, a digital TV, a desktop computer, a laptop computer, a kiosk, a monitor, and the like.

The communication interface 110 may communicate with an external apparatus using a wired and wireless communication methods. The communication interface 110 may be configured to communicate via 3G, Long Term Evolution (LTE), 5G, Wi-Fi, Bluetooth, (Digital Multimedia Broadcasting (DMB), Advanced Television Systems Committee (ATSC), Digital Video Broadcasting (DVB), Local Area Network (LAN), and the like. The external apparatus may include a web server, a cloud, a set-top box, and the like. For example, the communication interface 110 may receive a content including an image and information related to the image included in the content from the external apparatus. The communication interface 110 communicating with the external apparatus may be referred to as a communicator, a communication module, a transceiver, and the like.

The processor 120 may control each configuration of the display apparatus 100. For example, the processor 120 may control the communication interface 110 to receive a content including an image and information related to the image, and control the display 130 to process the image and display the processed image as a three-dimensional content.

The processor 120 may obtain an object disparity regarding an object included in the image and the number of captured images based on the received information related to the image. For example, the received information related to the image may include an object disparity, an object depth, or information of a camera that captured the image, the number of captured images, and information regarding the focused object, and the like. In an embodiment, the information of the camera may include a baseline, a focal length, a pixel size, and the like. For example, if the received information related to the image includes the object disparity, the processor 120 may obtain the object disparity from the received information related to the image. If the received information related to the image includes the object depth and the camera information, the processor 120 may obtain the object disparity based on the object depth and the camera information. For example, the object disparity may be obtained using (Equation 1).

$$\text{Depth} = (\text{Baseline} \times \text{Focal Length}) / (\text{Object Disparity} \times \text{Pixel Size}) \quad \text{(Equation 1)}$$

If the received image includes a plurality of objects, the processor 120 may move each object to a zero plane and obtain the object disparity based on the object moved to the zero plane.

The processor 120 may identify whether the display disparity representable by the display matches the object disparity. If the display disparity does not match the object disparity, the processor 120 may generate additional images by performing image interpolation based on the display disparity, the object disparity, and the number of captured images. In some cases, a total number of the received images and the generated additional images may exceed the number of images representable on the display 130. In this case, the processor 120 may perform an additional processing process regarding the image. For example, the processor 120 may identify whether the object disparity is displayable based on the display disparity. A case where the object disparity is not displayable on the display apparatus 100 may be similar to a case where the number of images exceeds the number of representable images. If the object disparity is not displayable on the display apparatus 100, the processor 120 may resize a resolution of the image including the object based on the display disparity. The resizing of the resolution of the image may reduce the object disparity and the number of additional images, as well as reducing the resolution of the image. In addition, if the total number of images of the received images and the generated additional images exceeds the number of images displayable on the display 130, the processor 120 may remove the exceeded number of images from the received content and the generated additional images.

The received images may include a moving object having a position that changes. If the object included in the image is a moving object and the received information related to the image includes information regarding the focused moving object and an object depth of the moving object, the processor 120 may obtain an object disparity of the moving object based on the object depth. In addition, the processor 120 may generate additional images by performing the image interpolation based on the obtained object disparity of the moving object and the display disparity. If the moving object moves closer to the camera, the processor 120 may reduce the number of captured images and increase a rate of the image interpolation. In addition, the processor 120 may resize the resolution of the image included in the content to reduce the object disparity of the moving object. The processor 120 may control the display 130 to display the three-dimensional content based on the images included in the received content and the generated additional images.

The display 130 may include a plurality of layers. The display 130 may set a representable disparity (display disparity) based on the included layers. The display 130 may display the three-dimensional content based on the received images and the generated additional images according to the control of the processor 120. For example, the display 130 may be implemented as a liquid crystal display (LCD), an organic light emitting diode (OLED), a flexible display, a touch screen, and the like. If the display 130 is implemented as a touch screen, the display apparatus 100 may receive a control command via the touch screen.

Figure 3:
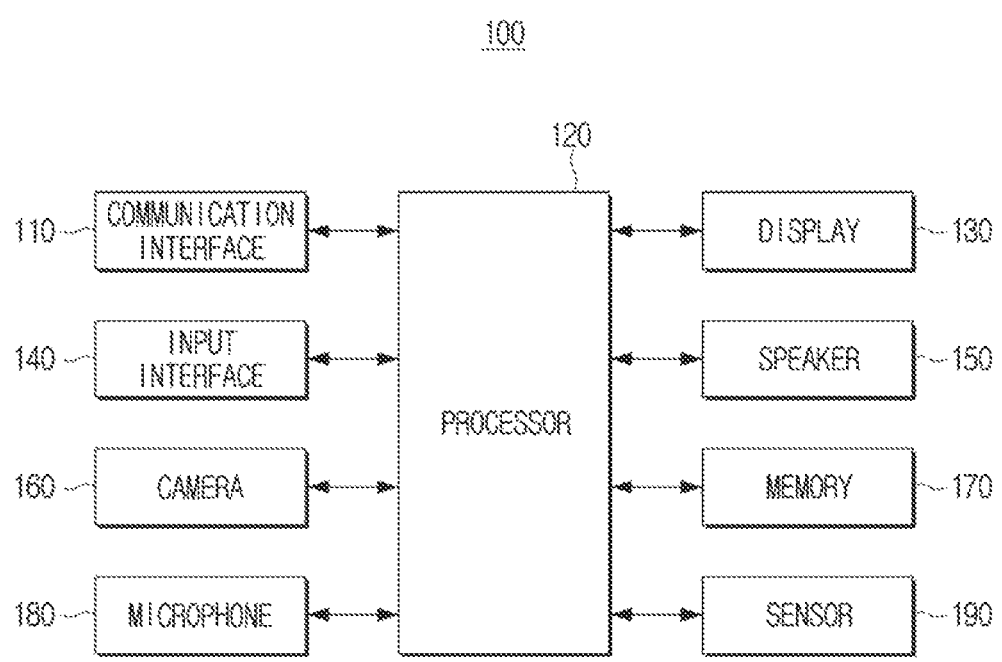
FIG. 3 is a block diagram illustrating a specific configuration of the display apparatus according to an embodiment.

FIG. 3 is a block diagram illustrating a specific configuration of the display apparatus according to an embodiment.

Referring to FIG. 3, the display apparatus 100 may include the communication interface 110, the processor 120, the display 130, an input interface 140, a speaker 150, a camera 160, a memory 170, a microphone 180, and a sensor 190. The communication interface 110 and the display 130 in FIG. 3 are substantially the same as the communication interface 110 and the display 130 described above with reference to FIG. 2, and therefore the specific description thereof will not be repeated regarding FIG. 3.

The input interface 140 may receive a command of a user. For example, the input interface 140 may include any one or any combination of a keyboard, a keypad, a touch pad, a mouse, an input and output port, and the like. In an embodiment, the input and output port may include ports such as High-Definition Multimedia Interface (HDMI), DisplayPort (DP), RGB, Digital Visual Interface (DVI), Universal Serial Bus (USB), Thunderbolt, LAN, and the like. If the input interface 140 includes the input and output port, the input interface 140 may receive a content including images and information related to the images via an external apparatus and the like. The input interface 140 which receives a user's command, a content, and the like may be referred to as an inputter, an input module, and the like.

The speaker 150 may output an audio signal that is obtained through audio processing. In addition, the speaker 150 may output an input command of a user, state information or operation information of the display apparatus 100, and the like as a voice or a notification sound.

The camera 160 may image surrounding environment of the display apparatus 100. In addition, the camera 160 may image facial expression or movement of a user. The processor 120 may recognize a control command based on the captured facial expression or the movement of the user and perform the control operation corresponding to the recognized control command. For example, the camera 160 may include a charge-coupled device (CCD) sensor and a complementary metal oxide semiconductor (CMOS) sensor. In addition, the camera 160 may also include an RGB camera and a depth camera.

The memory 170 may store data, algorithm, and the like for executing the function of the display apparatus 100 and store programs, instructions, and the like executed on the display apparatus 100. The algorithm stored in the memory 170 may be loaded on the processor 120 by the control of the processor 120 and execute the image processing process such as additional image generation, resizing of the image resolution, removal of the selected image, and the like. For example, the memory 170 may be implemented as a type of a ROM, a RAM, an SSD, a memory card, and the like.

The microphone 180 may receive a user's voice. The processor 120 may recognize the control command based on the input voice and perform a control operation corresponding to the recognized control command.

The sensor 190 may detect an object around the display apparatus 100. The processor 120 may recognize a control command based on the detected signal and perform a control operation corresponding to the recognized control command. In addition, the sensor 190 may detect information of the surrounding environment of the display apparatus 100. The processor 120 may perform a corresponding control operation based on the information of the surrounding environment detected by the sensor 190. For example, the sensor 190 may include an acceleration sensor, a gravity sensor, a Gyro sensor, a geomagnetic sensor, a direction sensor, a motion recognizing sensor, a proximity sensor, a voltmeter, an ammeter, a barometer, a hygrometer, a thermometer, an illuminance sensor, a heat detection sensor, a touch sensor, an infrared sensor, an ultrasonic sensor, and the like.

The display apparatus 100 may include all of the above elements or may include some elements. In addition, the display apparatus 100 may further include elements performing various functions other than the above elements. Hereinabove, the configuration of the display apparatus 100 has been described. Hereinafter, a process in which the display apparatus 100 processes an image using the received image and information related to the image will be described.

Figure 4:
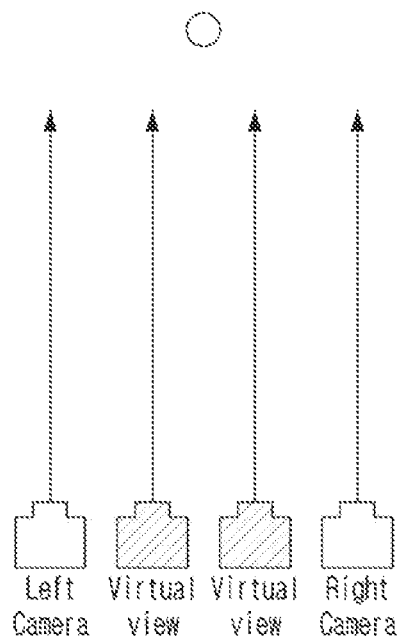
FIG. 4 is a diagram illustrating an image processing process according to an embodiment.
Figure 4:
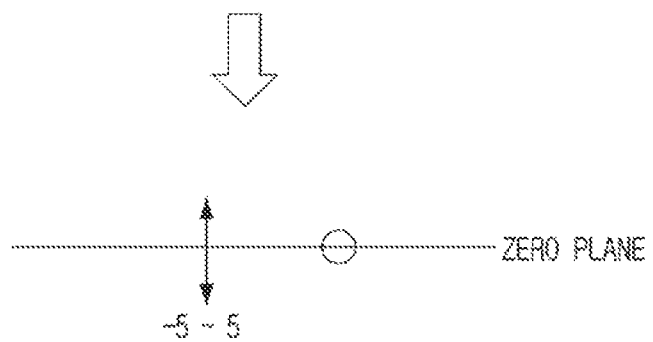

FIG. 4 is a diagram illustrating an image processing process according to an embodiment.

Referring to FIG. 4, cameras may image an object (e.g., a circle). In an embodiment, the number of the object is one, and a left camera and a right camera may capture images of the single object. In other words, the object may be imaged by two cameras. The captured images may include the object. The cameras may obtain depth information of the object. In addition, an electronic apparatus may calculate the object disparity of the object based on the captured images and the obtained depth information. For example, the electronic apparatus may generate a three-dimensional content based on the captured images and the obtained depth information. Examples of the electronic apparatus include a server, a cloud, a computer, and the like. In an embodiment, the object depth may be 3,000 mm and the object disparity may be 15. The electronic apparatus may transmit a generated three-dimensional content and information related to images included in the three-dimensional content to the display apparatus. In an embodiment, the information related to the image may include the object depth, the object disparity, the information of the focused object, and the like.

The display apparatus 100 may identify the object using the information regarding the focused object. In addition, the display apparatus 100 may display the three-dimensional content by processing the images to be representable on the display apparatus 100 based on the received captured images and information.

In an embodiment, the display disparity representable on the display apparatus 100 which has received the three-dimensional content may be 5 (−5 to 5). The display apparatus 100 may determine whether the object disparity matches the display disparity. In an example illustrated in FIG. 4, the display disparity is 5 and the object disparity is 15, the display apparatus 100 may determine that the object disparity does not match the display disparity. In this case, the display apparatus 100 may perform the image interpolation process. The display apparatus 100 may determine a rate of the image interpolation using (Equation 2).

$$\text{Interpolation Rate (SR Rate)} = \text{Object Disparity}/\text{Display Disparity} \quad \text{(Equation 2)}$$

The display apparatus 100 may determine the image interpolation rate as 3 by (Equation 2). Accordingly, the display apparatus 100 may generate two additional images (virtual images including the object that is seen from virtual viewpoints positioned between a viewpoint of the left camera and a viewpoint of the right camera) between the received images. The display apparatus 100 may display the three-dimensional content by displaying two received images and two additional images.

the image may include a plurality of objects and the disparities of the plurality of objects may be values different from each other.

Figure 5:
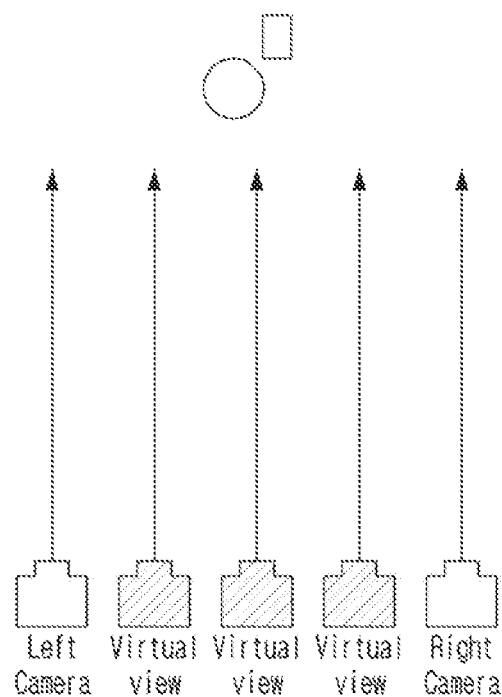
FIG. 5 is a diagram illustrating a processing process of an image including a plurality of objects according to an embodiment.
Figure 5:
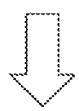
Figure 5:
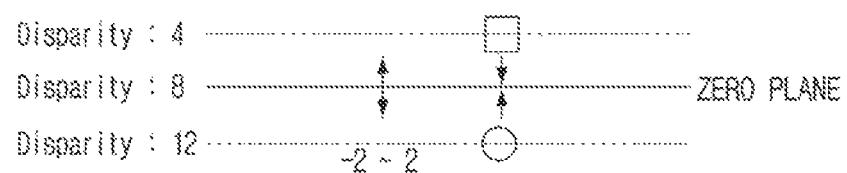

FIG. 5 is a diagram illustrating a processing process of an image including a plurality of objects according to an embodiment.

Referring to FIG. 5, cameras may image a plurality of objects (e.g., a circle, and a square). The images captured by a left camera and a right camera are actually captured images. In other words, the plurality of objects may be imaged by two cameras. Among the plurality of objects, the circle may be positioned in front compared to the square, and disparity of the circle may be 9. The square may be positioned at the back compared to the circle and disparity of the square may be 3. The display apparatus 100 may receive a three-dimensional content including images and information related to the images. If the image includes a plurality of objects having different disparities, the display apparatus 100 may move the plurality of objects to the zero plane, and obtain an object disparity based on the objects moved to the zero plane. The zero plane may refer to an optimal position for representing the plurality of objects. In an embodiment, the zero plane may be a position proximate to an average disparity of the plurality of object disparities. In FIG. 5, the disparity of the circle is 12 and the disparity of the square is 4, and accordingly, the disparity of the object moved to the zero plane may be 8 (−8 to 8). The display disparity representable by the display apparatus 100 may be 2 (−2 to 2). The display apparatus 100 may determine whether the object disparity matches the display disparity, and perform the image interpolation process, if they do not match. The display apparatus 100 may determine the image interpolation rate as 4 (i.e., 4=8/2) by (Equation 2). Accordingly, the display apparatus 100 may generate three additional images (virtual images) between the received images. The display apparatus 100 may display a three-dimensional content by displaying two received images and three additional images.

Figure 6:
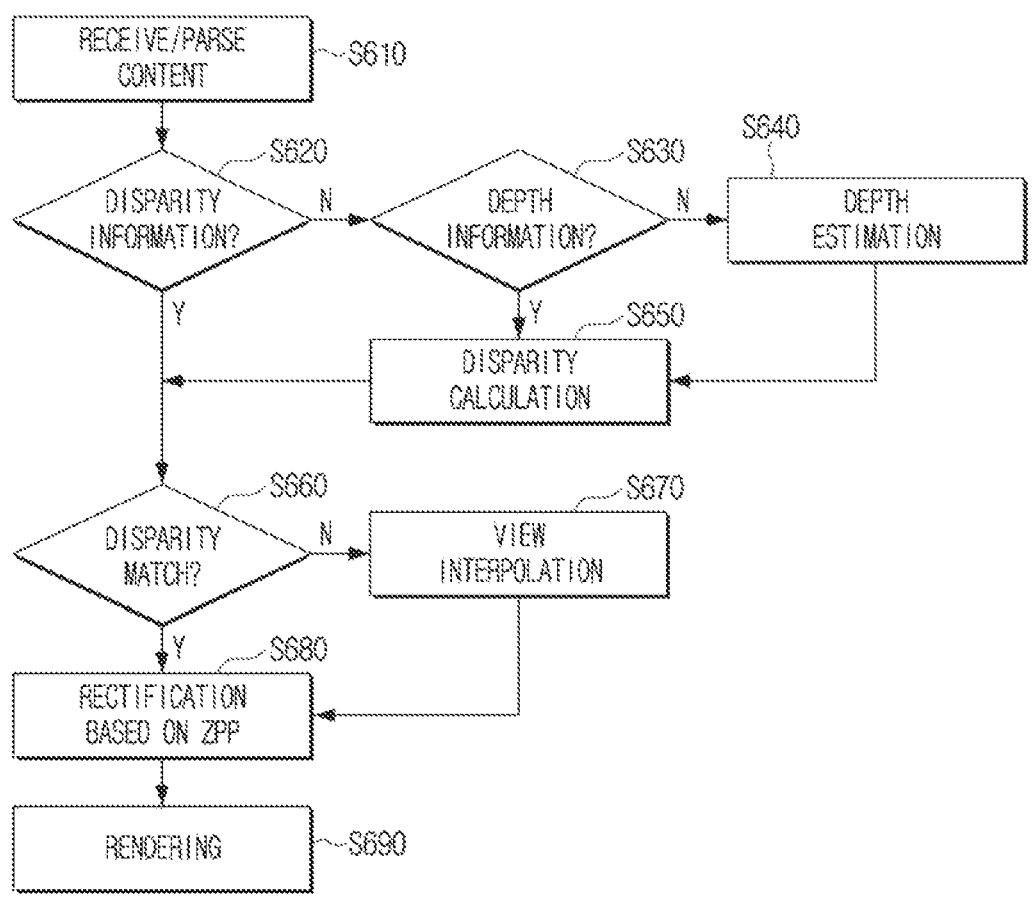
FIG. 6 is a flowchart illustrating a process of displaying a three-dimensional content according to an embodiment.

FIG. 6 is a flowchart illustrating a process of displaying a three-dimensional content according to an embodiment.

Referring to FIG. 6, the display apparatus 100 may receive and parse a three-dimensional content including images and information related to the images (operation S610). The display apparatus 100 may determine whether the received information related to the images includes object disparity information (operation S620). If the object disparity information is not included, the display apparatus 100 may determine whether the object depth information is included (operation S630). If the object depth information is not included, the information related to the images may include information regarding a focused object. The display apparatus 100 may estimate the object depth using the information regarding the focused object (operation S640). For example, the display apparatus 100 may determine a focused object included in each image based on the information regarding the focused object.

If the information related to the images includes the object depth information in operation S630 or the object depth is estimated in operation S640, the display apparatus 100 may calculate the object disparity using the object depth information (operation S650). The display apparatus 100 may estimate the object disparity based on a difference in positions between pixels of the focused objects included in each image. If the information related to the images includes the object disparity information, the display apparatus 100 may obtain the object disparity from the received information related to the images.

The display apparatus 100 may determine whether the display disparity matches the object disparity (operation S660). If the display disparity does not match the object disparity, the display apparatus 100 may perform the image (view) interpolation process (operation S670). The image interpolation process has been described above with reference to FIGS. 4 and 5.

The display apparatus 100 may perform rectification of the image based on zero parallax plane (ZPP) (operation S680). The received images and the generated additional images are images with a slight parallax. Accordingly, it may be necessary to perform the image matching process in order to display a plurality of images with a parallax in one screen. The image rectification may refer to a rectification process of a kind of stereo image. Then, the display apparatus 100 may perform rendering of the three-dimensional content including the plurality of images (operation S690). In other words, the display apparatus 100 may display the three-dimensional content.

Figure 7:
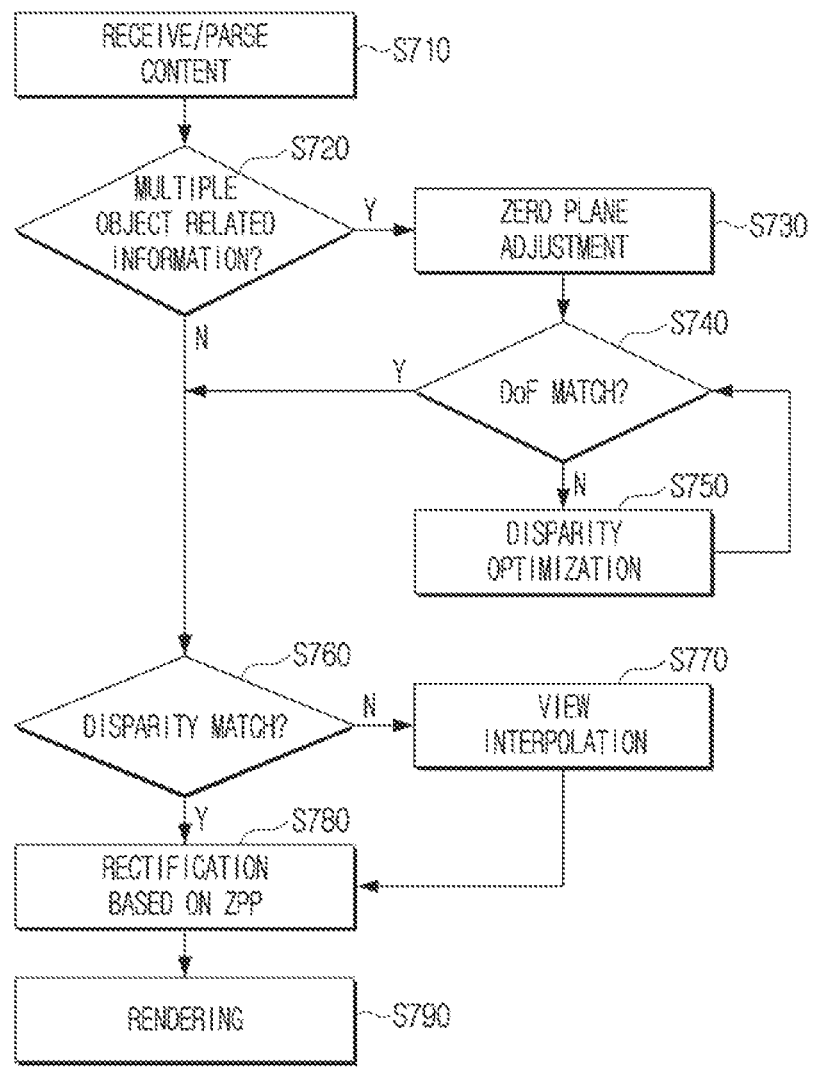
FIG. 7 is a flowchart illustrating a process of displaying a content including a plurality of objects according to an embodiment.

FIG. 7 is a flowchart illustrating a process of displaying a content including a plurality of objects according to an embodiment.

Referring to FIG. 7, the display apparatus 100 may receive and parse a three-dimensional content including images and information related to the images (operation S710). The display apparatus 100 may determine whether the information related to the image includes information related to multiple objects (operation S720). If the information related to multiple objects is included, the display apparatus 100 may perform a zero plate adjustment process (operation S730). In other words, the display apparatus 100 may move the objects to the suitable zero plane and obtain the object disparities so that all of the plurality of object disparities are representable.

The display apparatus 100 may determine whether depth of field (DoF) matches (operation S740). In other words, the display apparatus 100 may determine whether the image disparity is representable by the display disparity. If DoF does not match, the display apparatus 100 may optimize the image disparity (operation S750). For example, if the image disparity is not representable based on the display disparity, the display apparatus 100 may resize the image resolution or select and remove some images.

If the DoF does not match, the display apparatus 100 may determine whether the disparities match (operation S760). In other words, the display apparatus 100 may determine whether the display disparity matches the object disparity. If the display disparity does not match the object disparity, the display apparatus 100 may perform the image (view) interpolation process (operation S770).

If the disparities match, the display apparatus 100 may perform rectification of the image based on the zero parallax plane (ZPP) (operation S780). Then, the display apparatus 100 may perform rendering of the three-dimensional content including the plurality of images (operation S790). In other words, the display apparatus 100 may display the three-dimensional content.

If a total number of images exceeds the number of images representable on the display or if the object disparity exceeds the display disparity, the display apparatus 100 may resize the image resolution or remove some images. This will be described in detail below.

FIG. 8A is a diagram illustrating information of the display apparatus 100 according to an embodiment and FIG. 8B is a diagram illustrating information of a content including an image according to an embodiment. The description will be made with reference to FIGS. 8A and 8B.

Referring to FIG. 8A, in an embodiment, the display 130 of the display apparatus 100 may have a resolution of 2 K or 4 K, 51 images, a display disparity of 2, and a total representable disparity of 102. If the object disparity of the image captured by 21 cameras is 8, the display apparatus 100 may insert three additional images between the captured images by performing 4× image interpolation. Accordingly, a total number of images may be 81. In addition, the total object disparity may be 168 by (Equation 3). The information regarding the captured image is shown on the first row of FIG. 8B.

$$\text{Total Disparity} = \text{Disparity} \times \text{Number of Captured Images} \quad \text{(Equation 3)}$$

From the information of the captured image, the total disparity of the image is 168 and the total number of images subjected to the image interpolation is 81. In addition, the total disparity representable by the display 130 is 102 and the total number of images is 51. Accordingly, the disparity of the image and the total number of images exceed the disparity representable by the display 130 and the total number of images. Accordingly, the display apparatus 100 may perform the image optimization process by removing selected images or resizing the image resolution.

First, a method for removing selected image will be described. The display apparatus 100 may reduce the number of images to be represented to the number of images representable by the display 130 or less by removing some images from the captured images and the generated images, based on the number of images representable by the display. In addition, the display apparatus 100 may select representable images by the number of images representable by the display 130 or less. For example, the display apparatus 100 may select representable images by the number of images representable by the display 130 or less by removing the images positioned at both ends of the captured images and the generated images. In other words, the display apparatus 100 may remove the exceeded number of images from the received content and the generated additional images. In the above example, the display apparatus 100 may select 51 images by removing 15 images from each of both ends of 81 images subjected to the image interpolation.

The image selection method described above is advantageous that the resolution of the image is able to be maintained, but an angle of view may be decreased, since the images on edges are removed.

Next, the resizing of the image resolution will be described. In the above example, if the display apparatus 100 performs resolution resizing of the captured image having a resolution of 4K to 2K, the number of captured images is maintained and the disparity may be reduced by half (i.e., reduced from 8 to 4). When the image interpolation is performed after the resolution resizing, the image interpolation rate may be 2 and one additional image may be inserted between the captured images. Accordingly, as illustrated in a last row of FIG. 8B, the total number of captured images may be 21 and the total disparity may be 84. The total number of images shown in the last row of FIG. 8B is lower than the number of images shown in FIG. 8A. The disparity of the image information shown in the last row of FIG. 8B is greater than the disparity shown in FIG. 8A. In other words, the display apparatus 100 may perform the image optimization process by resizing the resolution of the image including the object based on the display disparity. The resizing method of the image resolution is disadvantageous that the resolution of the image is decreased, but an angle of view is able to be maintained.

Accordingly, the display apparatus 100 may perform the image optimization process by the image selection and removing method, in a case of a content that high-resolution image has to be represented rather than the angle of view, and may perform the image optimization process by the image resolution resizing method, in a case of a content that the angle of view has to be maintained rather than the resolution, such as a sport game or the like.

The image may include a moving object.

Figure 9:
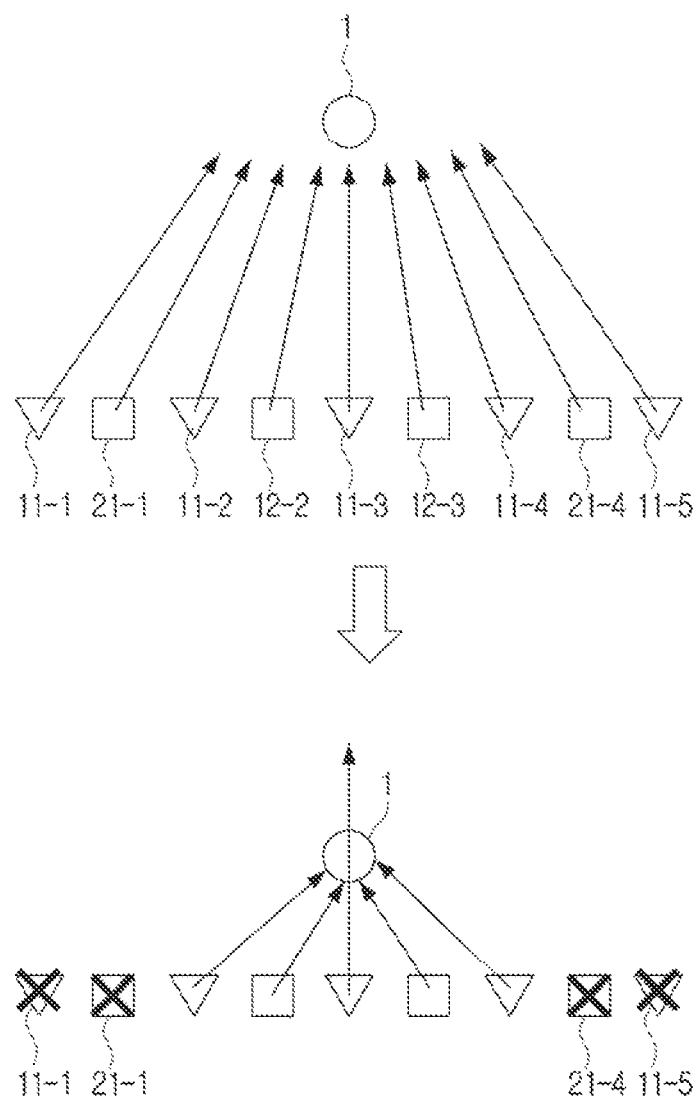
FIG. 9 is a diagram illustrating a processing process of an image including a moving object according to an embodiment.

FIG. 9 is a diagram illustrating a processing process of an image including a moving object according to an embodiment and FIG. 10 is a diagram illustrating a table including distance information according to movement of the object according to an embodiment. The description will be made with reference to FIGS. 9 and 10.

The object disparity of the moving object may change. Accordingly, the display apparatus 100 may perform the image processing process such as image interpolation variably with respect to the moving object. As illustrated in FIG. 9, five cameras may image the object 1 to obtain five captured images 11-1 to 11-15. The display apparatus 100 may generate and insert additional images 21-1 to 21-4 between the captured images 11-1 to 11-15 by the method described above. Referring to FIG. 9, if the object 1 moves closer in a direction where the cameras are disposed, the display apparatus 100 may perform the image interpolation based on the image captured by the camera proximate to the object. In other words, the images 11-1, 21-1, 21-4, and 11-5, positioned at both ends, which are captured from the cameras disposed farther from the proximate object 1 may be removed. When the object 1 moves, the object depth, the object disparity, and the like may change. Accordingly, the rate of the image interpolation may change. In other words, the display apparatus 100 may reduce the number of captured images and increase the rate of the image interpolation. In addition, the object disparity may increase according to the proximity of the moving object. The display apparatus 100 may resize the resolution of the image included in the content so that the object disparity of the moving object is reduced.

If the image includes a moving object, the camera may perform the imaging by focusing on the moving object. Accordingly, the information related to the image received by the display apparatus 100 may include information regarding the focused moving object and the like. The display apparatus 100 may determine whether the moving object is included in the image based on the received information regarding the focused moving object. The display apparatus 100 may display a three-dimensional content by performing the image processing process with respect to the moving object.

In some cases, the information related to the image may not include the information regarding the focused moving object. In this case, the display apparatus 100 may calculate a minimum disparity and a maximum disparity by using the object depth of the object included in the image. Referring to FIG. 10, the information regarding the object depth and the object disparity may be received by the display apparatus 100 or stored in the display apparatus 100 as metadata.

Hereinabove, various embodiments for representing the three-dimensional content on the display apparatus 100 have been described. Hereinafter, a method for controlling the display apparatus 100 will be described.

FIG. 11 is a flowchart illustrating a method for controlling a display apparatus according to an embodiment.

Referring to FIG. 11, the display apparatus 100 may receive a content including an image and information related to the image (operation S1110). The display apparatus 100 may obtain the object disparity of the object included in the image and the number of captured images based on the received information related to the image (operation S1120). For example, if the received information related to the image includes the object depth, the display apparatus 100 may obtain the object disparity based on the object depth. In addition, if the received information related to the image includes the information of camera captured an image, the display apparatus 100 may obtain the object depth based on the camera information. The display apparatus 100 may obtain the object disparity based on the obtained object depth. For example, the camera information may include a baseline, a focal length, and a pixel size. In addition, if the number of objects included in the image is more than one, the display apparatus 100 may move the object to the zero plane and obtain the object disparity based on the object moved to the zero plane.

The display apparatus 100 may identify whether the display disparity representable by the display matches the object disparity (operation S1130). If the display disparity does not match the object disparity, the display apparatus 100 may generate additional images by performing image interpolation based on the display disparity, the object disparity, and the number of captured images (operation S1140). Meanwhile, if the image to be displayed is not representable based on a specification of the display, the display apparatus 100 may optimize the image. For example, the display apparatus 100 may identify whether the object disparity is displayable based on the display disparity. If the object disparity is not displayable, the display apparatus 100 may resize a resolution of the image including the object based on the display disparity. In addition, if the number of images including the images included in the received content and the generated additional images exceeds the number of images displayable on the display, the display apparatus 100 may remove the exceeded number of images from images positioned at both ends in arrangement of the images included in the received content and the generated additional images.

The image may include a moving object. The information related to the image may include information regarding the focused moving object and the object depth of the moving object. In this case, the display apparatus 100 may obtain the object disparity of the moving object based on the object depth. The display apparatus 100 may generate additional images by performing the image interpolation based on the object disparity of the obtained moving object and the display disparity. In an embodiment, if the moving object moves closer, the display apparatus 100 may perform the image optimization process by reducing the number of captured images and increasing the rate of the image interpolation. In addition, the display apparatus 100 may perform the image optimization process of resizing the resolution of the image included in the content so as to reduce the object disparity of the moving object.

The display apparatus 100 may display a three-dimensional content based on the image included in the received content and the generated additional images (operation S1150).

The method for controlling the display apparatus 100 according to the various embodiments may be provided as a computer program product. The computer program product may include an S/W program itself or a non-transitory computer readable medium storing an S/W program.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a receiver circuit configured to receive captured images and information related to the captured images;
a display; and
a processor configured to:
obtain an object disparity of an object included in the captured images and a number of the captured images based on the information related to the captured images;
identify whether a display disparity representable by the display matches the object disparity;
based on the display disparity not matching the object disparity, generate interpolated images by performing image interpolation based on the display disparity, the object disparity, and the number of the captured images;
based on a sum of the number of the captured images and a number of the interpolated images exceeding a number of images displayable on the display, by an exceeded number of images, remove the exceeded number of images from the captured images and the interpolated images; and
control the display to display a three-dimensional content based on the captured images and the interpolated images after removing the exceeded number of images from the captured images and the interpolated images.

2. The display apparatus according to claim 1, wherein the processor is further configured to, based on the information related to the captured images comprising an object depth, obtain the object disparity based on the object depth.

3. The display apparatus according to claim 1, wherein the processor is further configured to, based on the information related to the captured images comprising information regarding a focused object, obtain the object disparity based on the information regarding the focused object.

4. The display apparatus according to claim 3, wherein the processor is further configured to, based on the information related to the captured images comprising camera information, obtain the object disparity based on the camera information, and
wherein the camera information comprises a baseline, a focal length, and a pixel size.

5. The display apparatus according to claim 1, wherein the processor is further configured to, based on the captured images comprising a plurality of objects comprising the object, move the plurality of objects to a zero plane, and obtain the object disparity based on the plurality of objects moved to the zero plane.

6. The display apparatus according to claim 1, wherein the processor is further configured to identify whether the object disparity is displayable on the display based on the display disparity, and based on the object disparity being not displayable on the display, resize a resolution of the captured images based on the display disparity.

7. The display apparatus according to claim 1, wherein the processor is further configured to, based on the object included in the captured images being a moving object and the information related to the captured images comprising information regarding the moving object and an object depth of the moving object, obtain the object disparity of the moving object based on the object depth, and generate the interpolated images based on the object disparity of the moving object and the display disparity.

8. The display apparatus according to claim 7, wherein the processor is further configured to, based on the moving object moving closer to a camera position, reduce the number of the captured images and increase a rate of the image interpolation.

9. The display apparatus according to claim 7, wherein the processor is further configured to, based on the moving object moving closer to a camera position, resize a resolution of the captured images to reduce the object disparity of the moving object.

10. A method for controlling a display apparatus, the method comprising:

receiving captured images and information related to the captured images;

obtaining an object disparity of an object included in the captured images and a number of the captured images based on the information related to the captured images;

identifying whether a display disparity representable by the display matches the object disparity;

based on the display disparity not matching the object disparity, generating interpolated images by performing image interpolation based on the display disparity, the object disparity, and the number of the captured images;

based on a sum of the number of the captured images and a number of the interpolated images exceeding a number of images displayable on the display, by an exceeded number of images, removing the exceeded number of images from the captured images and the interpolated images; and displaying a three-dimensional content based on the captured images and the interpolated images after removing the exceeded number of images from the captured images and the interpolated images.

11. The method according to claim 10, wherein the obtaining comprises, based on the information related to the captured images comprising an object depth, obtaining the object disparity based on the object depth.

12. The method according to claim 10, wherein the obtaining comprises, based on the information related to the captured images comprising information regarding a focused object, obtaining the object disparity based on the information regarding the focused object.

13. The method according to claim 12, wherein the obtaining comprises, based on the information related to the captured images comprising camera information, obtaining the object disparity based on the camera information, and
wherein the camera information comprises a baseline, a focal length, and a pixel size.

14. The method according to claim 10, wherein the obtaining comprises, based on the captured images comprising a plurality of objects comprising the object, moving the plurality of objects to a zero plane, and obtaining the object disparity based on the plurality of objects moved to the zero plane.

15. The method according to claim 10, further comprising:
identifying whether the object disparity is displayable on the display apparatus based on the display disparity; and
based on the object disparity being not displayable on the display apparatus, resizing a resolution of the captured images based on the display disparity.

16. The method according to claim 10, wherein the obtaining comprises, based on the object included in the captured images being a moving object and the information related to the captured images comprising information regarding the moving object and an object depth of the moving object, obtaining the object disparity of the moving object based on the object depth, and
wherein the generating comprises generating the interpolated images based on the object disparity of the moving object and the display disparity.

17. The method according to claim 16, further comprising:
based on the moving object moving closer to a camera position, reducing the number of the captured images and increasing a rate of the image interpolation.

18. The method according to claim 16, further comprising:
based on the moving object moving closer to a camera position, resizing a resolution of the captured images to reduce the object disparity of the moving object.

19. An electronic device comprising:
at least one memory configured to store computer readable instructions and information of a display disparity that is representable by a display apparatus; and
at least one processor configured to execute the computer readable instructions to:
obtain a plurality of captured images in which an object is captured from a plurality of different viewpoints;
obtain an object disparity of the object based on the plurality of captured images;
based on identifying that the object disparity not matching the display disparity, generate interpolated images from the plurality of captured images, based on the display disparity, the object disparity, and information of a number of the captured images;
based on a sum of the number of the captured images and a number of the interpolated images exceeding a number of images displayable on the display, by an exceeded number of images, remove the exceeded number of images from the captured images and the interpolated images; and
generate a three-dimensional image based on the captured images and the interpolated images after removing the exceeded number of images from the captured images and the interpolated images.

* * * * *